US012326949B2

(12) United States Patent
Mainer

(10) Patent No.: US 12,326,949 B2
(45) Date of Patent: *Jun. 10, 2025

(54) PRIVACY DATA MANAGEMENT IN DISTRIBUTED COMPUTING SYSTEMS

(71) Applicant: Microsoft Technology Licensing, LLC, Redmond, WA (US)

(72) Inventor: Michael Emanuel Mainer, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 407 days.

This patent is subject to a terminal disclaimer.

(21) Appl. No.: 17/542,017

(22) Filed: Dec. 3, 2021

(65) Prior Publication Data

US 2023/0153450 A1 May 18, 2023

Related U.S. Application Data

(63) Continuation-in-part of application No. 17/525,548, filed on Nov. 12, 2021.

(51) Int. Cl.
*G06F 21/62* (2013.01)
(52) U.S. Cl.
CPC ................. *G06F 21/6218* (2013.01)
(58) Field of Classification Search
CPC ... G06F 21/6218; G06F 21/6245; H04L 67/10
See application file for complete search history.

(56) References Cited

U.S. PATENT DOCUMENTS

| 7,263,696 B1 * | 8/2007 | Gruttadauria ........... G06F 9/445 717/166 |
| 8,117,640 B1 | 2/2012 | Moriconi |
| 8,302,169 B1 * | 10/2012 | Presotto .............. G06F 21/6218 726/19 |
| 9,372,687 B1 * | 6/2016 | Pai ........................ G06F 9/4451 |

(Continued)

OTHER PUBLICATIONS

Non-Final Office Action mailed on Mar. 1, 2024, in U.S. Appl. No. 17/525,548, 23 pages.

(Continued)

*Primary Examiner* — Aravind K Moorthy
(74) *Attorney, Agent, or Firm* — RAY QUINNEY & NEBEKER P.C.; Paul N. Taylor

(57) ABSTRACT

Computing systems, devices, and associated methods of privacy data management in a distributed computing system are disclosed herein. In one example, a method includes receiving a request from a data consumer for privacy information of data stored as data objects. The data objects are logically structured according to a data schema defining a property containing a property value representing user information and an annotation to the property containing a privacy classification of the property value of the property. The method also includes inspecting the data schema of the data objects to identify the privacy classification of the property and transmitting the identified privacy classification to the data consumer to allow the data consumer to configure an application to process the property value of the property in the data objects according to an organizational, legal, or regulatory processing requirement in one or more jurisdictions.

20 Claims, 6 Drawing Sheets

(56) References Cited

U.S. PATENT DOCUMENTS

| | | |
|---|---|---|
| 10,170,203 B1 | 1/2019 | Blechman |
| 10,404,757 B1 | 9/2019 | Horton |
| 10,541,938 B1 | 1/2020 | Timmerman |
| 10,594,730 B1 | 3/2020 | Summers et al. |
| 10,635,837 B1* | 4/2020 | Jun ................... G06F 21/6263 |
| 10,642,847 B1* | 5/2020 | Nerurkar ............ G06F 16/2462 |
| 10,671,752 B1 | 6/2020 | Misra |
| 10,872,029 B1 | 12/2020 | Bawcom |
| 10,891,380 B1 | 1/2021 | Deshpande |
| 10,965,547 B1 | 3/2021 | Esposito |
| 10,990,370 B1 | 4/2021 | Bawcom |
| 10,992,458 B2 | 4/2021 | Natanzon |
| 11,024,299 B1* | 6/2021 | Drake .................. G10L 15/197 |
| 11,081,219 B1 | 8/2021 | Dods |
| 11,126,745 B1 | 9/2021 | Sankuratripati |
| 11,416,874 B1 | 8/2022 | Scotney |
| 11,563,778 B1 | 1/2023 | Vanloo |
| 11,567,650 B1* | 1/2023 | Crowley ................ G06F 3/0482 |
| 11,567,975 B1 | 1/2023 | Day, Jr. |
| 11,599,667 B1* | 3/2023 | Tutuianu ............. G06F 21/6245 |
| 11,625,752 B2 | 4/2023 | Sabeg |
| 11,663,204 B1* | 5/2023 | Moore .................... G06N 5/025 |
| | | 707/737 |
| 11,777,932 B1 | 10/2023 | Kempf |
| 11,861,036 B1 | 1/2024 | Pflug |
| 11,874,937 B2 | 1/2024 | Gentleman |
| 11,909,769 B2 | 2/2024 | Das |
| 2003/0188177 A1 | 10/2003 | Clare, Jr. |
| 2005/0033481 A1* | 2/2005 | Budhraja ................ H02J 3/003 |
| | | 700/286 |
| 2005/0044409 A1 | 2/2005 | Betz |
| 2005/0278333 A1* | 12/2005 | Daniels ............... G06F 21/6245 |
| | | 707/999.009 |
| 2006/0294095 A1* | 12/2006 | Berk ...................... G06Q 30/02 |
| 2007/0239471 A1 | 10/2007 | Patton |
| 2007/0258638 A1 | 11/2007 | Howerton, Jr. |
| 2008/0141366 A1* | 6/2008 | Cross .................. G06F 21/6218 |
| | | 726/21 |
| 2008/0168527 A1* | 7/2008 | Koved ..................... G06F 21/33 |
| | | 726/1 |
| 2009/0055431 A1 | 2/2009 | Brodie |
| 2009/0055887 A1* | 2/2009 | Brodie ................ G06F 21/6227 |
| | | 726/1 |
| 2010/0077484 A1* | 3/2010 | Paretti .................... H04W 4/023 |
| | | 726/1 |
| 2010/0132044 A1 | 5/2010 | Kogan |
| 2010/0269122 A1 | 10/2010 | Malinowski |
| 2011/0064221 A1 | 3/2011 | McSherry |
| 2011/0087576 A1 | 4/2011 | Song |
| 2012/0102089 A1* | 4/2012 | Haines ................... G06Q 30/01 |
| | | 709/203 |
| 2012/0173439 A1* | 7/2012 | Levy ................... G06Q 30/0645 |
| | | 705/307 |
| 2012/0222083 A1* | 8/2012 | Vaha-Sipila ........ G06F 21/6245 |
| | | 726/1 |
| 2012/0278325 A1* | 11/2012 | Jenkins ................ G06Q 50/265 |
| | | 707/E17.089 |
| 2012/0278900 A1 | 11/2012 | Sebald |
| 2012/0311131 A1* | 12/2012 | Arrasvuori .......... G06F 21/6245 |
| | | 709/224 |
| 2013/0290200 A1 | 10/2013 | Singhal |
| 2013/0298247 A1 | 11/2013 | Laurila et al. |
| 2013/0347057 A1* | 12/2013 | Hurwitz ............... G06F 21/6245 |
| | | 726/1 |
| 2014/0026131 A1 | 1/2014 | Ravi |
| 2014/0041047 A1 | 2/2014 | Jaye et al. |
| 2014/0089189 A1 | 3/2014 | Vasireddy |
| 2014/0090090 A1 | 3/2014 | Vasireddy |
| 2014/0156547 A1 | 6/2014 | Winston |
| 2014/0201045 A1* | 7/2014 | Pai ........................ G06Q 40/123 |
| | | 705/31 |
| 2014/0214637 A1 | 7/2014 | Pai |
| 2014/0325035 A1 | 10/2014 | Ding |
| 2014/0373182 A1* | 12/2014 | Peri ...................... G06F 21/6245 |
| | | 726/30 |
| 2015/0065087 A1 | 3/2015 | Cudak |
| 2015/0067883 A1 | 3/2015 | Shen |
| 2015/0096043 A1 | 4/2015 | Smith |
| 2015/0127793 A1 | 5/2015 | Pohlmann |
| 2015/0142682 A1 | 5/2015 | Ghaisas |
| 2015/0254456 A1* | 9/2015 | Jacquin ............... G06F 21/6245 |
| | | 726/1 |
| 2015/0254659 A1 | 9/2015 | Kulkarni |
| 2015/0350211 A1 | 12/2015 | Burgess |
| 2015/0379301 A1* | 12/2015 | Lesavich ............... G06F 16/951 |
| | | 726/28 |
| 2015/0381571 A1 | 12/2015 | Plasse |
| 2016/0044039 A1* | 2/2016 | Montanari .......... G06F 21/6218 |
| | | 726/27 |
| 2016/0080929 A1* | 3/2016 | Reshef .................. H04W 8/183 |
| | | 455/418 |
| 2016/0100299 A1 | 4/2016 | Nawrocki |
| 2016/0188801 A1 | 6/2016 | Tse |
| 2016/0188883 A1 | 6/2016 | Wang et al. |
| 2016/0210575 A1 | 7/2016 | Vu |
| 2016/0246966 A1 | 8/2016 | Batrouni |
| 2016/0246991 A1 | 8/2016 | Bell |
| 2016/0292236 A1* | 10/2016 | Joshi ..................... G06F 16/248 |
| 2016/0294781 A1* | 10/2016 | Ninan ................. H04L 63/0428 |
| 2016/0306989 A1* | 10/2016 | Embleton ............. H04L 63/102 |
| 2016/0335324 A1* | 11/2016 | Caulfield ................ G06F 16/29 |
| 2016/0373289 A1 | 12/2016 | Hernandez |
| 2017/0032613 A1* | 2/2017 | Ovalle ................... G07F 17/329 |
| 2017/0039387 A1* | 2/2017 | Leonardi ............. H04W 12/02 |
| 2017/0048245 A1* | 2/2017 | Owen ................... H04W 12/02 |
| 2017/0070539 A1 | 3/2017 | Sachs |
| 2017/0109142 A1* | 4/2017 | Kaushal ................... H04W 4/50 |
| 2017/0109541 A1 | 4/2017 | Ionescu |
| 2017/0154189 A1 | 6/2017 | Betzler et al. |
| 2017/0193239 A1 | 7/2017 | Chari |
| 2017/0270318 A1* | 9/2017 | Ritchie ............... G06F 21/6245 |
| 2017/0286700 A1 | 10/2017 | Sartor |
| 2017/0329991 A1* | 11/2017 | Van Dyne ........... G06F 21/6245 |
| 2017/0353444 A1* | 12/2017 | Karangutkar ......... H04L 63/102 |
| 2018/0096165 A1* | 4/2018 | Warshavsky ........ G06F 16/2282 |
| 2018/0113996 A1 | 4/2018 | Cai |
| 2018/0121261 A1* | 5/2018 | Nadig ................... G06F 16/212 |
| 2018/0131751 A1 | 5/2018 | Jones |
| 2018/0167462 A1* | 6/2018 | Blair ..................... H04L 63/107 |
| 2018/0189661 A1* | 7/2018 | Tatourian ................ H04W 4/38 |
| 2018/0276401 A1 | 9/2018 | Allen |
| 2018/0341782 A1 | 11/2018 | Barday |
| 2019/0026163 A1 | 1/2019 | Subbiah |
| 2019/0080334 A1 | 3/2019 | Copeland |
| 2019/0139367 A1* | 5/2019 | Isaac ................... G07F 17/3244 |
| 2019/0156053 A1 | 5/2019 | Vogel |
| 2019/0158506 A1 | 5/2019 | Brouillette |
| 2019/0272387 A1 | 9/2019 | Gkoulalas-Divanis |
| 2019/0310929 A1 | 10/2019 | Wright |
| 2019/0318121 A1* | 10/2019 | Hockenbrocht .... G06F 16/2456 |
| 2019/0347428 A1 | 11/2019 | Youssefi |
| 2019/0354964 A1 | 11/2019 | Snow |
| 2019/0377853 A1* | 12/2019 | Obaidi ................... G06F 21/32 |
| 2019/0378166 A1 | 12/2019 | Eich |
| 2019/0379695 A1 | 12/2019 | Angara |
| 2020/0019713 A1 | 1/2020 | Varga et al. |
| 2020/0043066 A1* | 2/2020 | Obaidi ................... G06N 20/00 |
| 2020/0050787 A1 | 2/2020 | Mahalle |
| 2020/0082096 A1 | 3/2020 | Pistoia |
| 2020/0090795 A1* | 3/2020 | Chang ................... G06F 21/552 |
| 2020/0099690 A1* | 3/2020 | Mohandoss ............. G06F 21/51 |
| 2020/0118010 A1 | 4/2020 | Lee |
| 2020/0118068 A1 | 4/2020 | Turetsky et al. |
| 2020/0133640 A1* | 4/2020 | Thiru ........................ G06F 8/22 |
| 2020/0134750 A1* | 4/2020 | Wolf ..................... G06F 3/04847 |
| 2020/0143037 A1 | 5/2020 | Sunkavally |
| 2020/0151351 A1* | 5/2020 | Skourtis ............... G06F 21/6254 |
| 2020/0169881 A1 | 5/2020 | Linton |
| 2020/0184556 A1 | 6/2020 | Cella |
| 2020/0273046 A1 | 8/2020 | Biswas |
| 2020/0320202 A1* | 10/2020 | Farkash ................. G06N 20/00 |
| 2020/0341876 A1* | 10/2020 | Gandhi .................... H04L 67/34 |

(56) References Cited

U.S. PATENT DOCUMENTS

| | | |
|---|---|---|
| 2020/0357000 A1 | 11/2020 | Levine |
| 2020/0394733 A1 | 12/2020 | Lewis |
| 2020/0401963 A1 | 12/2020 | Matuchniak |
| 2021/0073357 A1* | 3/2021 | Desai ................ G06F 21/6218 |
| 2021/0081561 A1 | 3/2021 | Blandin |
| 2021/0141913 A1 | 5/2021 | Mosconi |
| 2021/0192651 A1 | 6/2021 | Groth |
| 2021/0192867 A1* | 6/2021 | Fang ................... G07C 5/0816 |
| 2021/0248247 A1 | 8/2021 | Poothokaran |
| 2021/0250369 A1* | 8/2021 | Åvist .................. G06F 21/552 |
| 2021/0297487 A1 | 9/2021 | Hegde |
| 2021/0306418 A1 | 9/2021 | Lamba |
| 2021/0312077 A1 | 10/2021 | Jain et al. |
| 2021/0312469 A1 | 10/2021 | Natali, Jr. |
| 2021/0327548 A1 | 10/2021 | Sparks |
| 2021/0342822 A1 | 11/2021 | Lau |
| 2021/0390190 A1 | 12/2021 | Walker |
| 2022/0019671 A1 | 1/2022 | Boone |
| 2022/0019682 A1* | 1/2022 | Sislow ................. H04L 67/562 |
| 2022/0036373 A1 | 2/2022 | O'Brien |
| 2022/0067207 A1 | 3/2022 | Lindsay |
| 2022/0086163 A1* | 3/2022 | Pandey ............... G06F 21/6245 |
| 2022/0100893 A1 | 3/2022 | Kussmaul |
| 2022/0108274 A1 | 4/2022 | Krishnamoorthy |
| 2022/0164472 A1 | 5/2022 | Cannon |
| 2022/0171873 A1* | 6/2022 | Lundbæk ............ G06F 16/9538 |
| 2022/0172222 A1* | 6/2022 | Chin ....................... H04L 67/53 |
| 2022/0179978 A1 | 6/2022 | Stroila |
| 2022/0182397 A1 | 6/2022 | Romero Zambrano et al. |
| 2022/0182817 A1 | 6/2022 | Karpoor |
| 2022/0188452 A1* | 6/2022 | Song ........................ G06N 3/08 |
| 2022/0198034 A1 | 6/2022 | Rodriguez |
| 2022/0198044 A1* | 6/2022 | Madhavan ........... G06Q 50/265 |
| 2022/0207163 A1 | 6/2022 | Gentleman |
| 2022/0237565 A1 | 7/2022 | Dzierzanowski |
| 2022/0245282 A1 | 8/2022 | Achan |
| 2022/0283930 A1 | 9/2022 | Figueredo De Santana Burke, Jr. |
| 2022/0286438 A1 | 9/2022 | Burke, Jr. |
| 2022/0309170 A1* | 9/2022 | Iyer ...................... G06F 21/604 |
| 2022/0318426 A1* | 10/2022 | Solheim .............. G06F 21/6245 |
| 2022/0343016 A1 | 10/2022 | Horesh |
| 2022/0351139 A1 | 11/2022 | Mowatt |
| 2022/0360621 A1 | 11/2022 | Tripathy |
| 2022/0407889 A1 | 12/2022 | Narigapalli |
| 2023/0005391 A1 | 1/2023 | Sharma |
| 2023/0020523 A1 | 1/2023 | Kulkarni |
| 2023/0045034 A1 | 2/2023 | Shaik |
| 2023/0066295 A1* | 3/2023 | Cheng ...................... G06N 3/02 |
| 2023/0095080 A1* | 3/2023 | Yang ................... G06F 21/6227 726/22 |
| 2023/0095576 A1* | 3/2023 | Ureche ................... G06F 21/84 726/26 |
| 2023/0105207 A1 | 4/2023 | Srivastava |
| 2023/0105432 A1 | 4/2023 | Katharine |
| 2023/0137378 A1 | 5/2023 | Laterza |
| 2023/0153457 A1 | 5/2023 | Mainer |
| 2023/0208740 A1 | 6/2023 | Langer |
| 2024/0184906 A1* | 6/2024 | Taylor ................. G06F 21/6218 |

OTHER PUBLICATIONS

U.S. Appl. No. 17/525,548, filed Nov. 12, 2021.
"International Search Report and Written Opinion Issued in PCT Application No. PCT/US22/041606", Mailed Date : Nov. 15, 2022, 11 Pages.
"International Search Report Written Opinion Issued in PCT Patent Application No. PCT/US22/041788", Mailed Date : Nov. 24, 2022, 10 Pages.
Notice of Allowance mailed on Oct. 15, 2024, in U.S. Appl. No. 17/525,548, 11 pages.
U.S. Appl. No. 17/552,548, filed Nov. 12, 2021.
Notice of Allowance mailed on Feb. 3, 2025, in U.S. Appl. No. 17/525,548, 11 Pages.

* cited by examiner

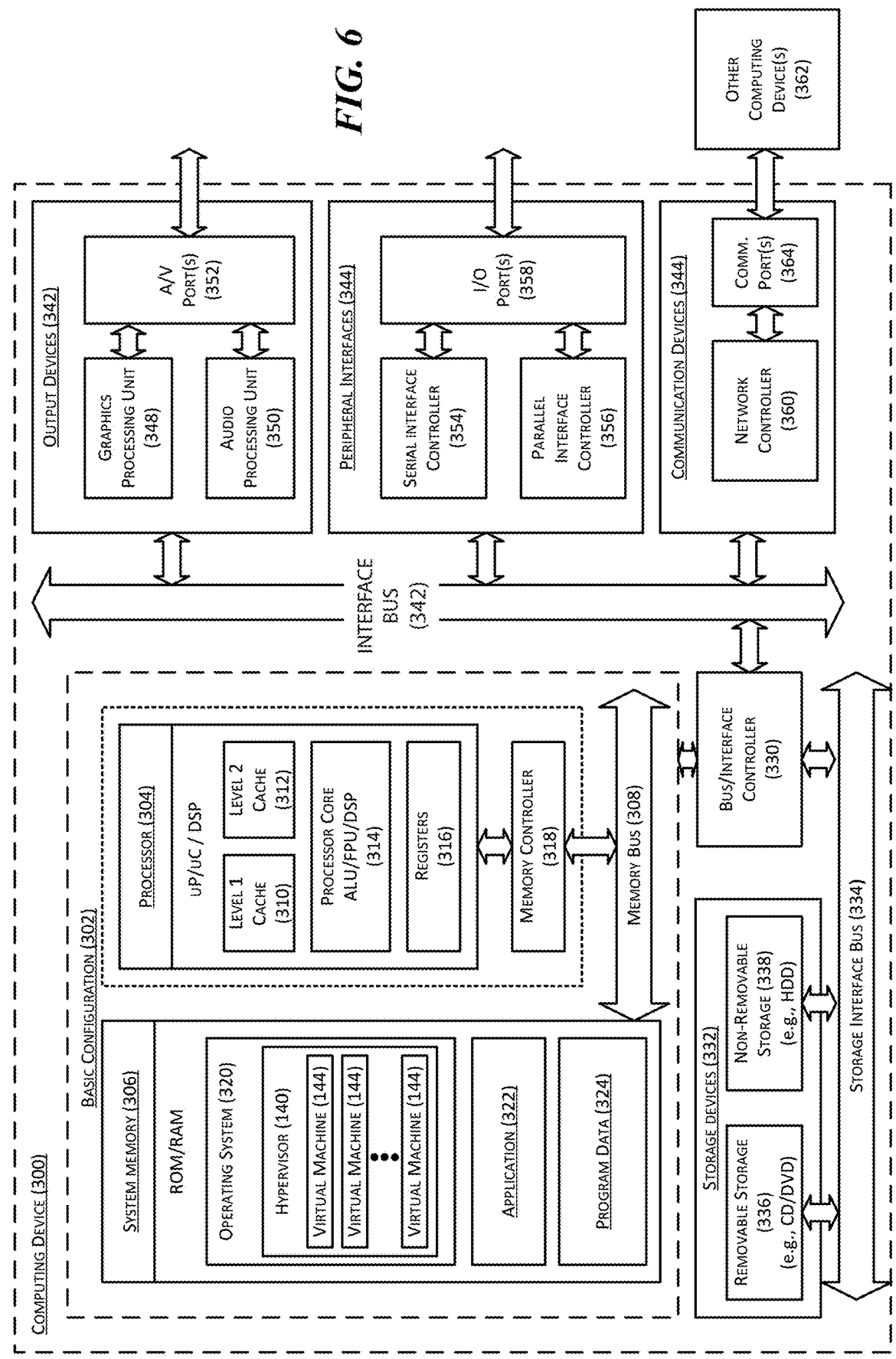

PRIVACY DATA MANAGEMENT IN DISTRIBUTED COMPUTING SYSTEMS

CROSS-REFERENCE TO RELATED APPLICATION(S)

This application is a continuation-in-part and claims priority to U.S. patent application Ser. No. 17/525,548, filed on Nov. 12, 2021, the disclosure of which is incorporated herein in its entirety.

BACKGROUND

Enterprises, organizations, educational institutions, and other entities can often retain a large amount of data in computer storage systems. For example, a company can retain data of current and former employees as well as data of clients or customers. Such data are typically stored in internal storage as individual database records. The computer storage can also provide facilities for querying the stored data based on suitable criteria and analyzing the stored data via aggregation, pattern recognition, or other suitable techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Stored data containing various types of personal information may be subject to data privacy laws or regulations. Data privacy generally refers to relationships between collection, retention, and dissemination of data and legal/regulatory issues surrounding such activities. Data privacy issues can exist wherever personally identifiable information (PII) or other sensitive information is collected, stored, used, and finally deleted in digital form. Data privacy issues may arise in response to information from a wide range of sources, such as employment records, healthcare records, criminal justice investigations and proceedings, financial institutions and transactions, biological trait analysis, residence and geographic records, location-based services, and academic research.

Complying with data privacy laws and regulations can be labor intensive, cumbersome, and prone to error. For example, user data of an organization surfaced from a database system can include personal identification, addresses, phone numbers, and other types of private information. The user data, however, typically is not in a data structure that also contains privacy classification of the various types of private information. Without such privacy classification, data consumers (e.g., applications or developers thereof) of such user data may not have prerequisite information to comply with applicable data privacy regulations when processing the user data. Also, data of privacy classification is typically not propagated when the user data is processed by multiple applications in a computing system. For example, an initial application can process the user data to produce an output in compliance with privacy laws and regulations. However, the initial application may not identify any privacy classifications of data in the produced output. Thus, any PII in the produced output may be mishandled by additional applications downstream of the initial application in the computing system. Such difficulty becomes even more pronounced as the user data is propagated cross privacy compliance boundaries, such as from one jurisdiction (e.g., the United States) to another (e.g., the European Union).

Several embodiments of the disclosed technology can address certain aspects of the foregoing difficulty by utilizing a data schema that overlays privacy classification of types of private information as privacy metadata on user data stored as digital objects (e.g., as "user objects") in a computing system. In one implementation, the data schema defining a user object can include one or more properties each representing corresponding private information. For example, a user object according to the data schema can include properties of user identification, social network identifier, and full name with corresponding property values, such as "JohnL123," "examplesocialnetwork.com/user-id," and "John Jones," respectively. In further examples, the user object can include properties of user alias, subscription level, license assigned, etc. In other implementations, a user object according to the data schema can also include one or more attributes, elements, or other suitable parameters each representing corresponding private information or other suitable information.

According to certain aspects of the disclosed technology, a property in the data schema can also be annotated with a value (e.g., a string value) or reference that represents a privacy classification of private information represented by the property value of the corresponding property. For example, the user identification property can be annotated as "personal identification information." As such, in the example above, the property value of "JohnL123" is classified as personal identification information. The social network identifier property can be annotated as pseudo anonymous information. As such, "examplesocialnetwork.com/user-id" represents pseudo anonymous information. The full name property can be annotated as End User identification information (EUII). Thus, "John Jones" in the example above can be classified as EUII. In other embodiments, the user object can also be annotated to indicate various categories of private information the user object or a corresponding object type can contain in addition to the annotations to the properties. The categories can be the same/similar to or different than the privacy classification. In certain embodiments, categories can be aggregations or abstractions of different privacy classifications of various properties in an object or object type. For instance, example categories can include customer data, restricted data, persona data, and other suitable categories in the example user object above. In further implementations, one or more properties of the user object can also include sub-properties with corresponding annotations of private classification or categories.

In certain implementations, an administrator of an entity who owns the user data can utilize default privacy classifications supplied by, for instance, a cloud service provider. In other implementations, the administrator can also apply legal or regulatory privacy classifications. In further implementations, the administrator can define custom privacy classifications regarding how the entity would like the user data to be used by other downstream applications in the computing system. Such custom privacy classifications can be overlaid on the user data by adding and/or modifying properties and corresponding annotations in the data schema of the user data. For instance, in the example above, the administrator can change the social network identifier from "pseudo anonymous information" to "EUII" by modifying the annotation value to the social network identifier property.

In another example, the administrator can add new properties (e.g., user principal name, first name, last name, phone number, email address, etc.) with corresponding privacy classifications of, e.g., "EUII" or other suitable privacy classifications.

Several embodiments of the disclosed technology can also provide a privacy agent that is configured to allow data consumers of the user data to query for privacy classifications and/or categories (collectively referred to as "privacy information") of private information contained in a user object. For example, in one implementation, the privacy agent can provide an application programming interface (API) that is configured to receive a request (e.g., a Hypertext Transfer Protocol or HTTP request) from a data consumer. An example data consumer can be an integrated development environment (IDE) used by a developer to create an application that consumes the user data as input. In response to receiving the request, the privacy agent can be configured to identify and inspect the data schema according to which the user object is structured for privacy information. The privacy agent can then be configured to provide the identified privacy information of the user object to the consumer. In turn, the data consumer can configure the application to process property values of the various properties of the user object according to the received privacy information to comply with various legal/regulatory requirements.

The data consumer can also configure the application to store the received privacy information along with data output from the application. As such, the privacy information can be propagated in a computing system such that any downstream applications can be configured to comply with applicable legal/regulatory requirements according to the privacy classifications and/or categories. For example, to comply with a retention requirement of EUII for a prescribed period, a data processor can be configured to periodically query the stored output data using "EUII" as a keyword for any properties having a corresponding privacy classification of "EUII." The data processor can then be configured to delete, obfuscate, or otherwise process any properties having the privacy classification of "EUII" when, for example, the corresponding user object has been present for a threshold period. As such, privacy information of the user object can be propagated in a computing system to allow downstream applications to suitably process output data derived from the original user object.

Several embodiments of the disclosed technology can also allow efficient modification of the privacy information of the user data. For example, to change the privacy classification of social network identifier from pseudo anonymous information to EUII, an owner of the user data can modify the data schema of the user object such that the privacy annotation corresponding to the social network identifier contains "EUII" instead of "pseudo anonymous information." Such a change can then be propagated, for instance, by the privacy agent to other copies of the private information stored in the computing system. As such, privacy classification of social network identifier in all user objects and any derived objects can be modified without modifying any of the user objects or derived objects. After such a modification, downstream applications can process the user data and any derived data originated from the user data according to the new privacy classification.

BRIEF DESCRIPTION OF THE DRAWINGS

FIG. 6 is a computing device suitable for certain components of the distributed computing system in FIG. 1.

DETAILED DESCRIPTION

Figure 1:
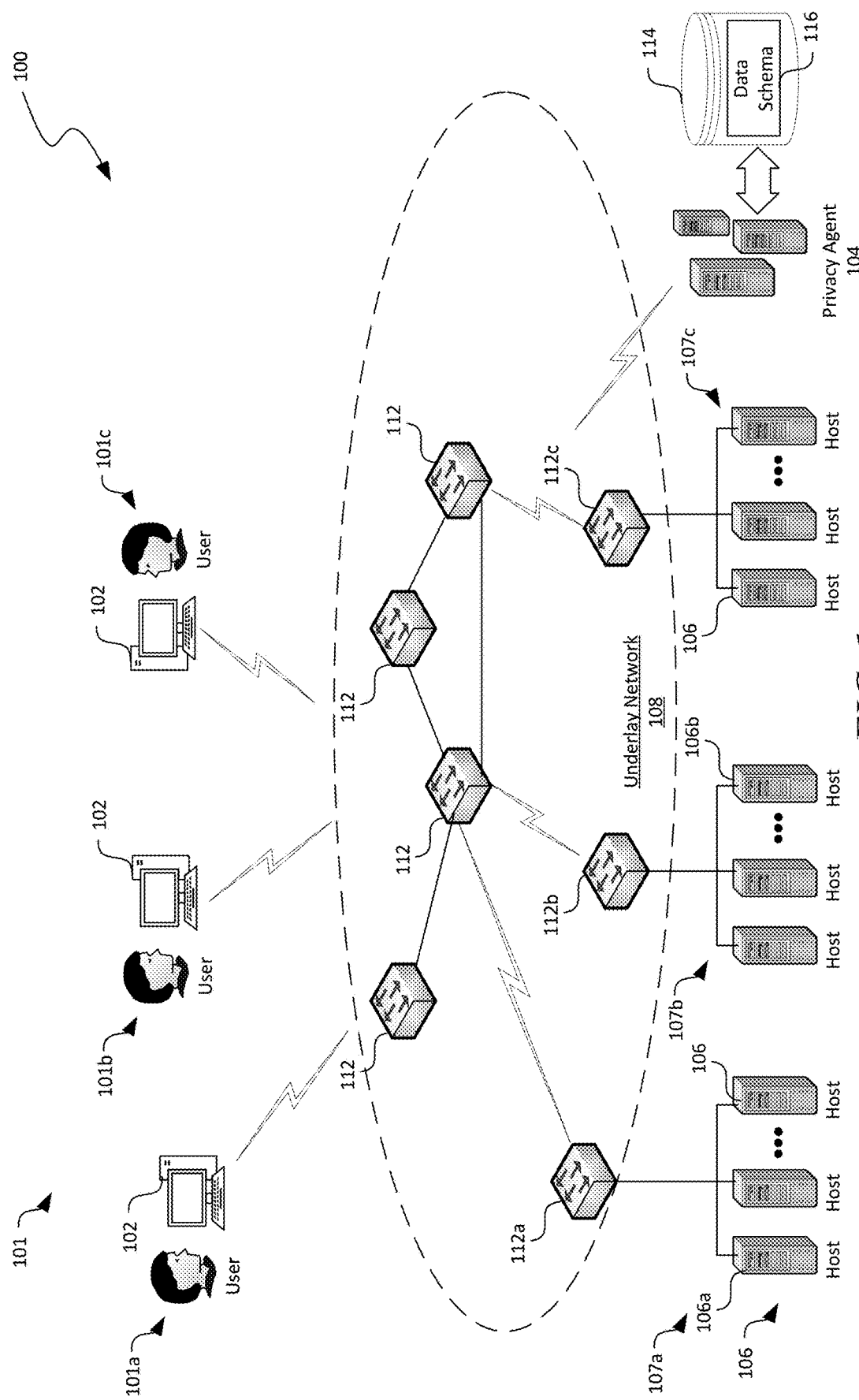
FIG. 1 is a schematic diagram illustrating a distributed computing system implementing privacy data management in accordance with embodiments of the disclosed technology.

Certain embodiments of systems, devices, components, modules, routines, data structures, and processes for privacy data management in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As described herein, a distributed computing system includes an interconnected computer network having a plurality of network nodes that connect a plurality of servers or hosts to one another or to external networks (e.g., the Internet). A network node can include a physical or virtual network device. Example network nodes include routers, switches, hubs, bridges, load balancers, security gateways, or firewalls. A host can include a physical computing device configured to implement, for instance, one or more virtual machines, containers, virtual switches, or other suitable virtualized components. For example, a host can include a server having a hypervisor configured to support one or more virtual machines, virtual switches, or other suitable types of virtual components.

A computer network can be conceptually divided into an overlay network implemented over an underlay network. An overlay network is an abstracted network implemented over and operating on top of an underlay network. The underlay network can include multiple physical network nodes interconnected with one another. An overlay network can include one or more virtual networks. A virtual network is an abstraction of a portion of the underlay network in the overlay network. A virtual network can include one or more virtual end points referred to as tenant sites individually used by a user or tenant to access the virtual network and associated computing, storage, or other suitable resources. A tenant site can host one or more tenant end points (TEPs), for example, virtual machines configured to execute one or more user applications. The virtual networks can interconnect multiple TEPs on different hosts. Virtual network nodes in the overlay network can be connected to one another by virtual links individually corresponding to one or more network routes along one or more physical network nodes in the underlay network.

As described herein, a resource or computing resource can include any physical or virtual component of limited availability within a distributed computing system such as a datacenter. Example computing resources can include processor capacities (e.g., CPUs or cores), network capacities (e.g., network connections and network bandwidth), and computer readable storage capacities (e.g., memory blocks in solid state devices). Executing an application in a distributed computing system can consume various amount and types of computing resources. For example, executing an application for voice-over-IP conference can consume a certain amount of compute, storage, and network resources. In another example, executing an application of database management can consume a certain amount of processor and storage resources.

A computing service can provide computing resources to users over a computer network such as the Internet. Common examples of computing services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also described herein, private information contained in data objects (e.g., user objects) can include information that a user may wish to keep from public viewing. Example of such private information include personal identifications, social network identifier, full names, addresses, social security numbers, phone numbers, credit card numbers, financial account numbers, along with passwords to websites and other venues. Such private information can be classified or categorized according to certain criteria. For example, user identification property can be annotated as "personal identification information." The social network identifier property can be annotated as pseudo anonymous information. The full name property can be annotated as End User identification information (EUII). Such classification and/or category of private information is collectively referred to as privacy information herein.

Complying with data privacy laws and regulations can be labor intensive, cumbersome, and prone to error for companies and other entities because data containing private information is typically not stored in a data structure that also contains privacy information of the various types of private information. Without such privacy information, data consumers (e.g., applications or developers thereof) of such stored data may not have prerequisite information to comply with applicable data privacy regulations when processing the data. Several embodiments of the disclosed technology can address certain aspects of the foregoing difficulty by utilizing a data schema that overlays privacy information as privacy metadata on underlying stored data containing private information. A privacy agent can then be configured to allow data consumers of the stored data to query for privacy information of the stored data. As such, the data consumer can configure the application to process the stored data according to the received privacy information to comply with legal/regulatory requirements, as described in more detail below with reference to FIGS. 1-6.

FIG. 1 is a schematic diagram illustrating a distributed computing system 100 implementing privacy data management in accordance with embodiments of the disclosed technology. As shown in FIG. 1, the distributed computing system 100 can include an underlay network 108 interconnecting a plurality of hosts 106, a plurality of client devices 102 associated with corresponding users 101, and a privacy agent 104 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown).

As shown in FIG. 1, the underlay network 108 can include one or more network nodes 112 that interconnect the multiple hosts 106 and the client devices 102 of the users 101. In certain embodiments, the hosts 106 can be organized into racks, action zones, groups, sets, or other suitable divisions. For example, as illustrated in FIG. 1, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topologies. The underlay network 108 can allow communications between hosts 106, the privacy agent 104, and the client devices 102 of the users 101. In other embodiments, the multiple host sets 107a-107c may share a single network node 112 or can have other suitable arrangements.

The hosts 106 can individually be configured to execute virtual machines 144 (shown in FIG. 2), containers (not shown), or user applications 147 (shown in FIG. 2) to provide computing, storage, and/or other cloud or other suitable types of computing services to the users 101. For example, as described in more detail below with reference to FIG. 2, one of the hosts 106 can initiate and maintain one or more virtual machines 144 upon requests from the users 101. The users 101 can then utilize the initiated virtual machines 144 to execute user applications 147 to perform computation, communication, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates corresponding users 101 to access computing services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The privacy agent 104 can be configured to allow data consumers in the distributed computing system to query for privacy information of stored data (e.g., user objects 120 shown in FIG. 3) in the distributed computing system 100. Though the following description uses the user objects 120 as examples to illustrate various aspects of the disclosed technology, embodiments of the disclosed technology can be applied to organizational data objects, social network data objects, or any other suitable types of data objects. As shown in FIG. 1, the privacy agent 104 can be operatively coupled to a network storage 114 containing data schema 116 according to which the user objects 120 is organized and stored in the distributed computing system 100. The privacy agent 104 can be configured to identify and inspect the data schema 116 according to which the user data is structured for privacy information 118 (shown in FIG. 3) upon receiving a request from a data consumer (e.g., IDE 130 shown in FIG. 3). The privacy agent 104 can then be configured to provide the identified privacy information to the data consumer. In turn, the data consumer can configure an application to process the various properties of the user object 120 according to the received privacy information to comply with various legal/regulatory requirements. Example components and operations suitable for the privacy agent 104 are described in more detail below with reference to FIG. 3.

Figure 2:
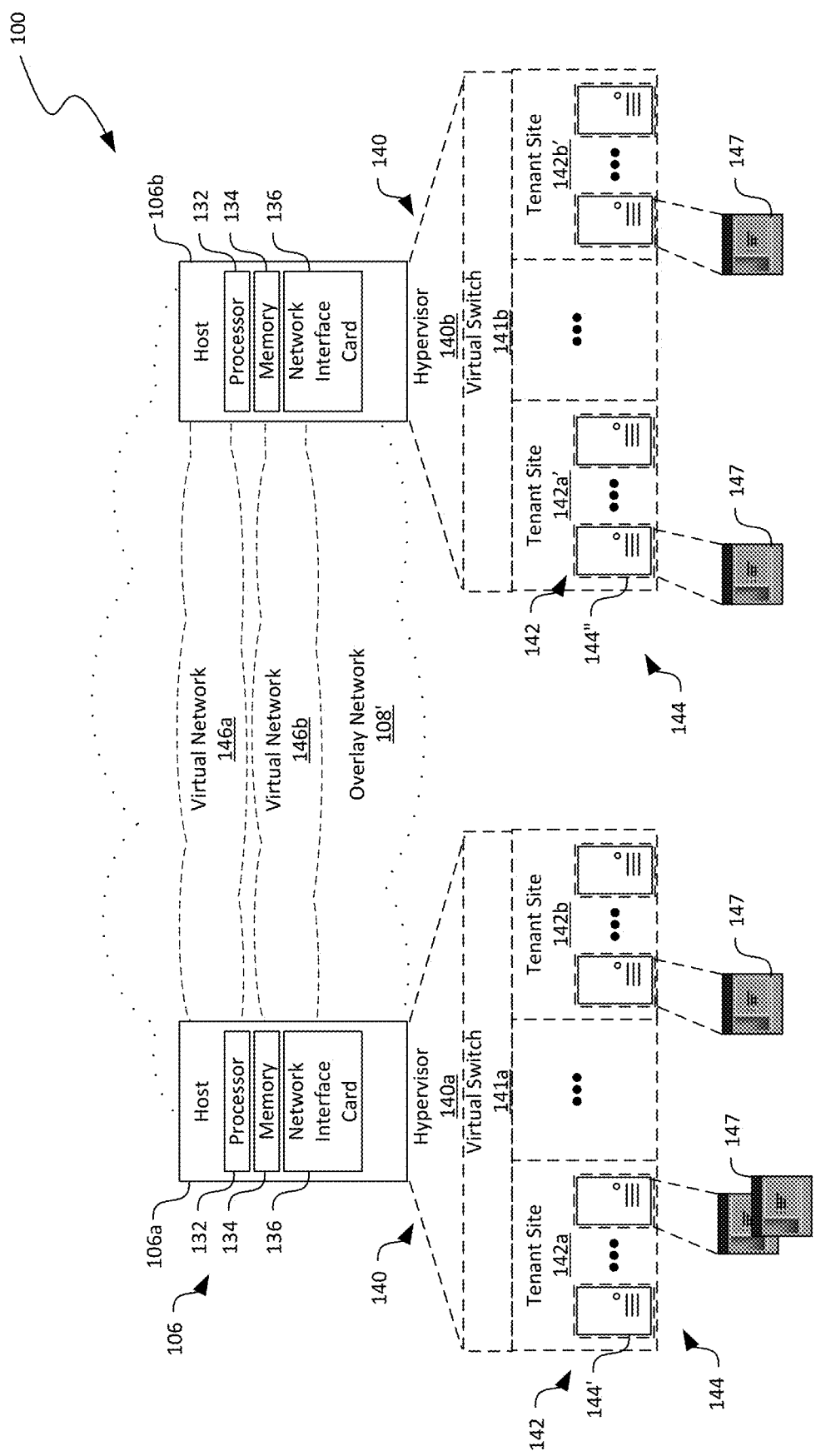
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. Specifically, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the distributed computing system 100 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and a network interface card 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The network interface card 136 can include a network adapter, a LAN adapter, physical network interface, or other suitable types of hardware component that connects a host 106 to the underlay network 108 (FIG. 1). In other embodiments, the hosts 106 can also include input/output devices configured to accept input from and provide output to an operator and/or an automated software controller (not shown), or other suitable types of hardware components.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first user 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more user applications 147 to provide suitable compute or other types of computing resources as computing services to the users 101 (FIG. 1) via the overlay network 108' and the underlay network 108 (FIG. 1). The user applications 147 and the virtual machines 144 on the virtual networks 146 can also communicate with one another via the overlay network 108' and the underlay network 108 even though the virtual machines 144 are located on different hosts 106. Communications of each of the virtual networks 146 can be isolated from other virtual networks 146. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

Figure 3:
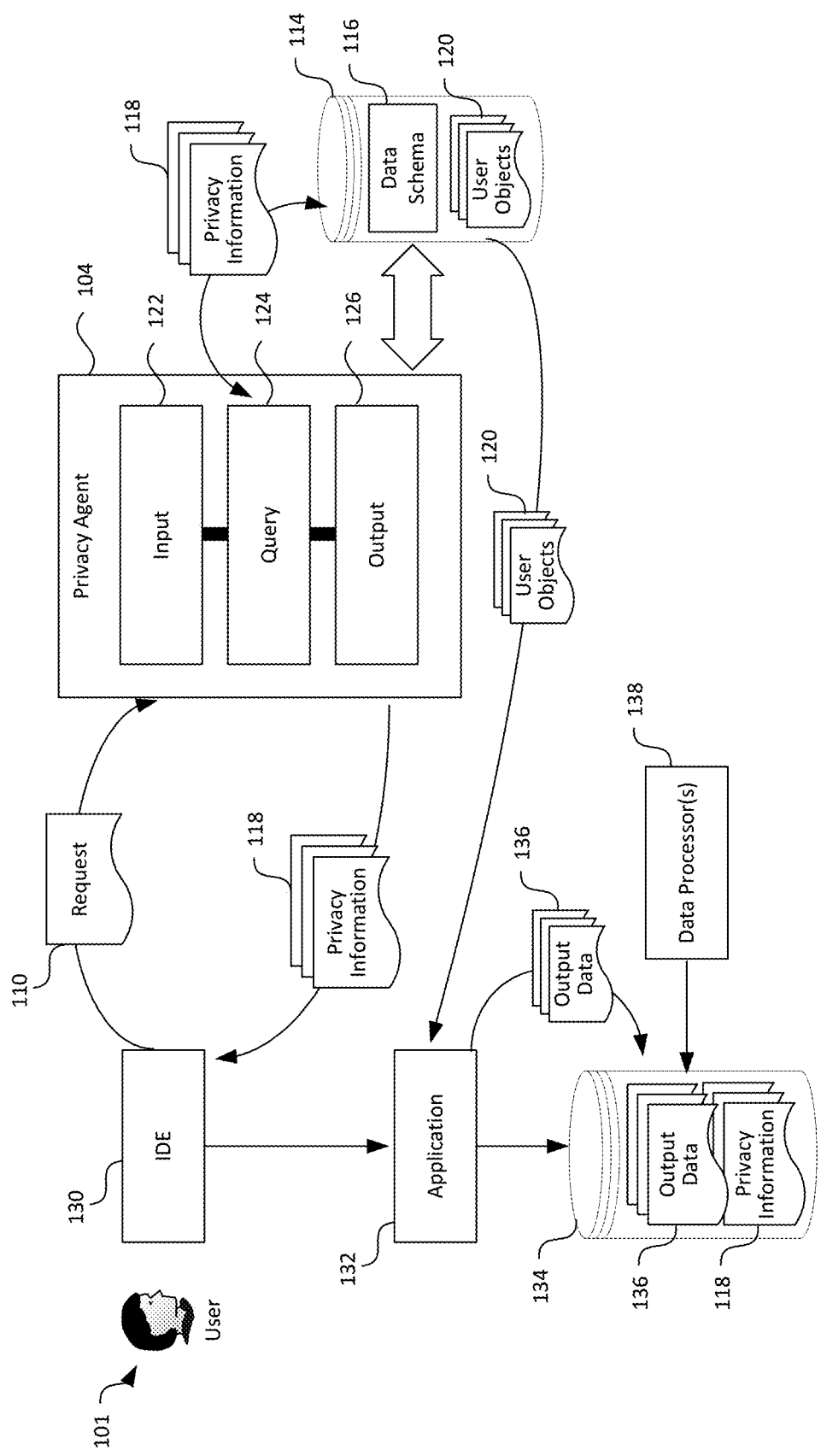
FIG. 3 is a schematic diagram illustrating certain hardware/software components of a privacy agent suitable for the distributed computing system of FIG. 1 in accordance with embodiments of the disclosed technology.

FIG. 3 is a schematic diagram illustrating certain hardware/software components of a privacy agent 104 suitable for the distributed computing system 100 of FIG. 1 in accordance with embodiments of the disclosed technology. As shown in FIG. 3, the privacy agent 104 can include an input component 122, a query component 124, and an output component 126 operatively coupled to one another. Though particular components of the privacy agent 104 are shown in FIG. 3, in other embodiments, the privacy agent 104 can also include calculation, network, database, or other suitable types of component(s).

The input component 122 can be configured to receive a request 110 for privacy information of user data stored in the network storage 114 as user objects 120. In the illustrated embodiment, the request 110 is transmitted by a user 101 via an IDE 130 used to configure an application 132. In other embodiments, the request 110 can be received from another application, system, component, or other suitable entities that consume digital objects with corresponding privacy information. Upon receiving the request 110, the input component 122 can be configured to authenticate the request 110 based on, for example, certificates, tokens, or other suitable authentication information. Upon authenticating the request 110, the input component 122 can be configured to forward the request 110 to the query component 124 for further processing.

The query component 124 can be configured to query the data schema 116 of the user objects 120 stored in the network storage 114 for privacy information of the user objects 120. In certain implementations, the user objects 120 can be structured as digital objects (referred to below as "user objects") according to the data schema 116. The data schema 116 can define a data structure with one or more properties containing corresponding property values representing private information. For example, a user object according to an example of the data schema 116 shown below can include properties of user identification (e.g., "Userid"), social network identifier (e.g., "socialnetworkID"), and full name (e.g., "FullName") with corresponding property values, such as "JohnL123," "examplesocialnetwork.com/user-id," and "John Jones," respectively.

In further examples, the user object can include properties of user alias, subscription level, license assigned, etc. In other implementations, a user object according to the data schema can also include one or more attributes, elements, or other suitable parameters each representing corresponding private information or other suitable information.

According to certain aspects of the disclosed technology, as shown in the example above, a property in the data schema 116 can also be annotated with a value (e.g., a string value) or reference that represents a privacy classification of private information represented by the property value of the corresponding property. For example, the user identification property can be annotated as "personal identification information." As such, in the example above, the property value of "JohnL123" is classified as personal identification information. The social network identifier property can be annotated as pseudo anonymous information. As such, "examplesocialnetwork.com/user-id" represents pseudo anonymous information. The full name property can be annotated as End User identification information (EUII). Thus, "John Jones" in the example above can be classified as EUII.

In other embodiments, the user object can also be annotated to indicate various categories of private information the user object can contain in addition to the annotations to the properties. The categories can be the same/similar to or different than the privacy classification. For instance, as shown in the example data schema 116 above, example categories or classes can include "Customer_Data,Restricted_Data,Personal_Data." The social network identifier property is annotated with both a privacy classification (e.g., "Public_Personal_Data") and a privacy class (e.g., "Personal_Data") while the user identifier property and the full name property only have privacy classification annotations of Pseudo Anonymous Information" and "EUII," respectively. In further implementations, one or more properties of the user object can also include sub-properties (not shown) with corresponding annotations of private classification or categories.

In certain embodiments, the query component 124 can be configured to query the data schema 116 using one or more property values of a user object as keywords for the privacy information. The following is example code in C# to query the example data schema 116 shown above for a user object corresponding to a user having a user identifier of "JohnJones1," a full name of "John Jones," and an email address of "jonjones@example.com":

```
<EntityType Name="user">
  <Annotation Term="Privacy.DataClasses"
Classes="Customer_Data,Restricted_Data,Personal_Data">
    <Property Name="Userid" Type="String" >
      <Annotation Term="Privacy" Classification="Pseudo Anonymous
Information"/>
  </Property>
    <Property Name="socialnetworkID" Type="String" />
      <Annotation Term=" Privacy" Classification="Public_Personal_Data" Class=
"Personal_Data" />
  </Property>
    <Property Name="FullName" Type="String" />
      <Annotation Term="Privacy" Classification="EUII">
  </Property>
</EntityType>
```

```
void Main( )
{
    User = new("JohnJones1", "John Jones", "jonjones@example.com");
    var type = user.GetType( );
    // Get privacy classification information for the user class.
    PrivacyClassificationClassAttribute[ ] classPrivacyAttributes =
Attribute.GetCustomAttributes(type, typeof(PrivacyClassificationClassAttribute)) as
PrivacyClassificationClassAttribute[ ];
    Console.WriteLine($"This {nameof(user)} object contains the following
privacy classification metadata:");
    foreach (var classification in classPrivacyAttributes)
    {
        Console.WriteLine(classification.Classification);
    }
    // Get privacy classification information for the properties on the user class.
    PropertyInfo[ ] propertyInfo = type.GetProperties( );
    foreach (var p in propertyInfo)
    {
      var privacyAttribute =
p.GetCustomAttribute(typeof(PrivacyClassificationPropertyAttribute)) as
PrivacyClassificationPropertyAttribute;
        Console.WriteLine($"The {p.Name} property has a privacy
classification of {privacyAttribute.Classification}.");
    }
}
```

In other implementations, the query component 124 can also be configured to query the user object for various categories of private information the user object can contain in addition to the annotations to the properties. The categories can be the same/similar to or different than the privacy classification. For instance, example categories can include customer data, restricted data, persona data, and other suitable categories. The following is example code in C# for query the example data schema 116 for such categories:

```
// <summary> An example implementation of a data type with privacy metadata
applied via attributes.</summary>
[PrivacyClassificationClassAttribute(PrivacyClass.Customer_Data)]
[PrivacyClassificationClassAttribute(PrivacyClass.Restricted_Data)]
[PrivacyClassificationClassAttribute(PrivacyClass.Personal_Data)]
public class User
{
    public User(string id, string socialnetworkID, string fullName, string
licenseAssignmentStates, string userPrincipalName)
    {
        Userid = id;
        SocialnetworkID = socialnetworkID;
        FullName = fullName;
    }
    [PrivacyClassificationProperty("End_User_Pseudoanonymous_Identifier
")]
    public string Id { get; set; }
    [PrivacyClassificationProperty("Personal_Data")]
    public string SocialnetworkID { get; set; }
    [PrivacyClassificationProperty("End_User_Identifiable_Information")]
    public string FullName { get; set; }
      [PrivacyClassificationProperty("Account_Data")]
    public string LicenseAssignmentStates { get; set; }
    [PrivacyClassificationProperty("End_User_Identifiable_Information")]
    public string UserPrincipalName { get; set; }
}
```

Upon executing the foregoing example code for the query component 124, the following is an example result of privacy information 118 generated based on the example schema 116 shown above:

This user object contains the following privacy classification metadata:
Customer_Data
Restricted_Data
Personal_Data
The Userid property has a privacy classification of
  End_User_Pseudoanonymous_Identifier.
The SocialnetworkID property has a privacy classification of Public_Data.
The FullName property has a privacy classification of
  End_User_Identifiable_Information.

Upon generating the privacy information 118, the query component 124 can instruct the output component 126 to transmit the privacy information 118 to the user 101 via the IDE 130.

In turn, the user 101 (or other suitable entities) can configure the application 132 using the IDE 130 to process property values of the various properties of the user objects 120 according to the received privacy information 118 to comply with various legal/regulatory requirements. For example, the full name property has a privacy classification of EUII. As such, the application 132 can be configured to obfuscate the property values of the full name property in the user objects 120 during execution. On the other hand, the social network identifier property has a privacy classification of "Public_Data." As such, the property values of the social network identifier property may be used without obfuscation or alternation. In further examples, the application 132 can be configured to perform anonymization, generalization, or other operations on the various properties of the user objects 120 according to the received privacy information 118.

The user 101 can also configure the application 132 to store the received privacy information 118 along with output data 136 from the application 132. As such, the privacy information 118 can be propagated in the distributed computing system 100 such that any downstream applications (e.g., data processor(s) 138) can be configured to comply with applicable legal/regulatory requirements according to the privacy classifications and/or categories in the privacy information 118. For example, to comply with a retention requirement of EUII for a prescribed period, a data processor 138 can be configured to periodically query the stored output data 136 using "EUII" as a keyword for any properties having a corresponding privacy classification of "EUII." The data processor 138 can then be configured to delete, obfuscate, or otherwise process any properties having the privacy classification of "EUII" when, for example, the corresponding user object 120 has been present for a threshold period. As such, privacy information 118 of the user object 120 can be propagated in the distributed computing system 100 to allow downstream applications to suitably process output data 136 derived from the original user object 120.

Several embodiments of the disclosed technology can also allow efficient modification of the privacy information 118 of the user objects 120. For example, to change the privacy classification of social network identifier from pseudo anonymous information to EUII, an owner of the user object 120 can modify the data schema 116 of the user object 120 such that the privacy annotation corresponding to the social network identifier contains "EUII" instead of "pseudo anonymous information." Such a change can then be propagated, for instance, by the privacy agent 104 to other copies of the private information 118 stored in the distributed computing system 100. As such, privacy classification of social network identifier in all user objects 120 and any derived objects can be modified without modifying any of the user objects 120 or derived objects. After such a modification, downstream data processors 138 can process the user objects and any derived data originated from the user objects according to the new privacy classification.

Figure 4:
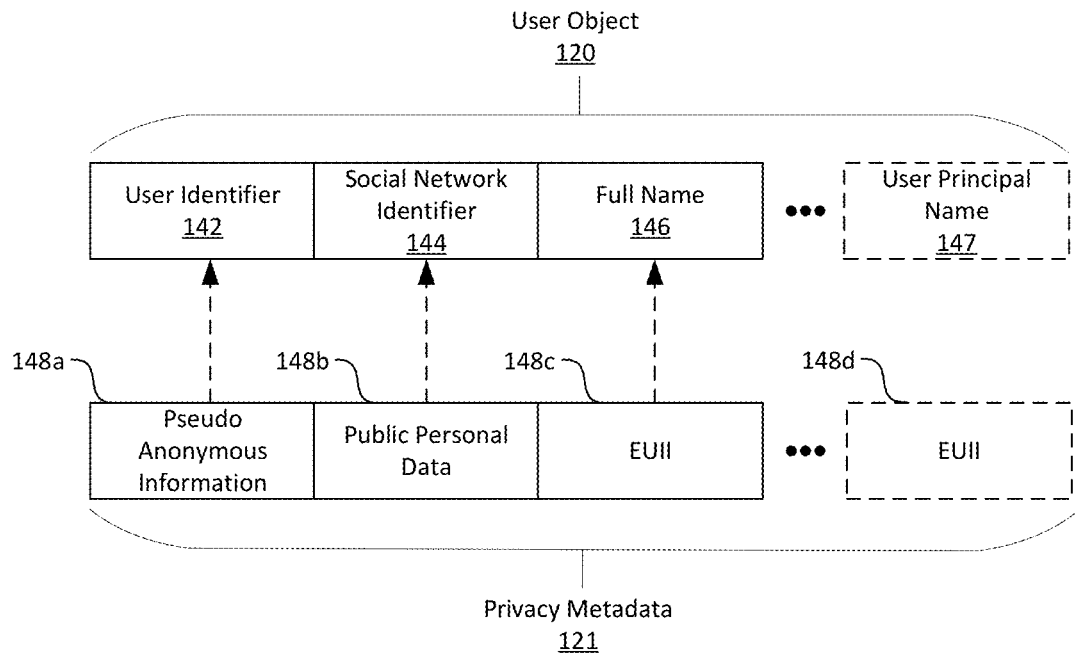
FIG. 4 is a schematic diagram of an example data structure suitable for the privacy agent in the distributed computing system of FIG. 1 in accordance with embodiments of the disclosed technology.

FIG. 4 is a schematic diagram of an example data structure suitable for the privacy agent in the distributed computing system of FIG. 1 in accordance with embodiments of the disclosed technology. As shown in FIG. 4, in the illustrated embodiment, the data structure can include a user object 120 having multiple data fields such as user identifier field 142, social network identifier field 144, a full name field 146, and other suitable data fields. Each of the foregoing data fields can be configured to contain a property value such as "JohnL123," "examplesocialnetwork.com/user-id," and "John Jones," respectively. The data fields of the user object 120 can also be overlaid with privacy metadata 121 having annotation fields corresponding to each of the data fields in the user object 120. For instance, first, second, and third annotation fields 148a, 148b, and 148c can individually contain data representing "Pseudo Anonymous Information," "Public Personal Data," and "EUII," each corresponding to the user identifier field 142, the social network identifier field 144, and the full name field 146, as shown in FIG. 4. In other embodiments, the user object 120 and the privacy metadata 121 can also be organized in other suitable ways.

In certain implementations, an administrator (not shown) of an entity who owns the user object 120 can utilize default privacy classifications supplied by, for instance, a cloud service provider. In other implementations, the administrator can also apply legal or regulatory privacy classifications. In further implementations, the administrator can define custom privacy classifications regarding how the entity would like the user data to be used by other downstream applications in the distributed computing system 100. Such custom privacy classifications can be overlaid on the user data by adding and/or modifying properties and corresponding annotations in the data schema of the user object 120. For instance, in the embodiment shown in FIG. 4, the administrator can change the social network identifier from "pseudo anonymous information" to "EUII" by modifying the annotation value to the social network identifier property in the second annotation field 148b. In other embodiments, the administrator can add new properties (e.g., user principal name, first name, last name, phone number, email address, etc.) with corresponding privacy classifications of, e.g., "EUII" or other suitable privacy classifications. For instance, the administrator can add a user principal name filed 147 (shown in phantom line for clarity) containing a principal name of the user and a corresponding annotation field 148d containing a value of "EUII" in the privacy metadata 121.

Figure 5A:
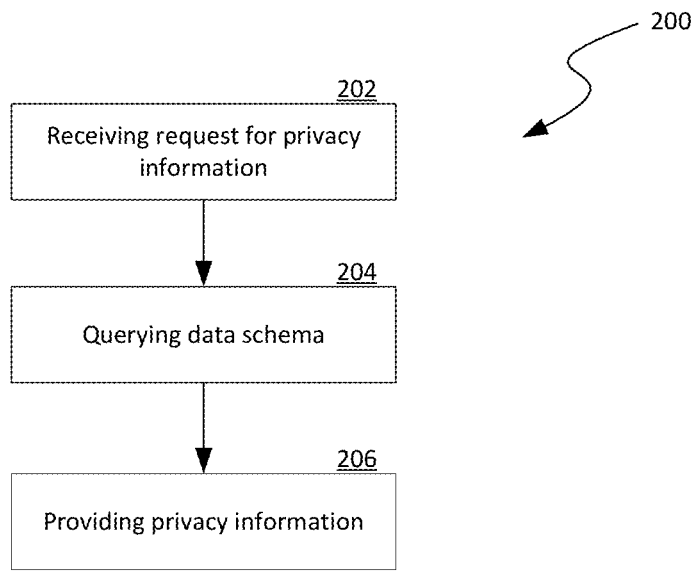
FIGS. 5A-5C are flowcharts illustrating processes of privacy data management in accordance with embodiments of the disclosed technology.
Figure 5B:
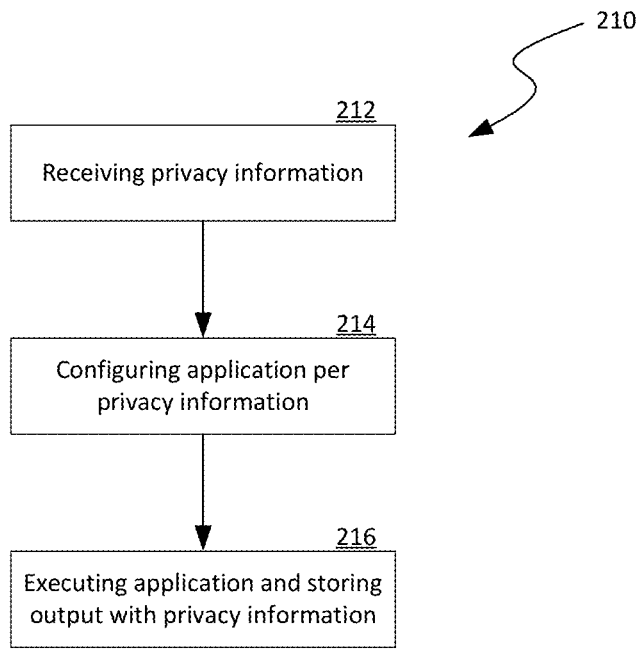
Figure 5C:
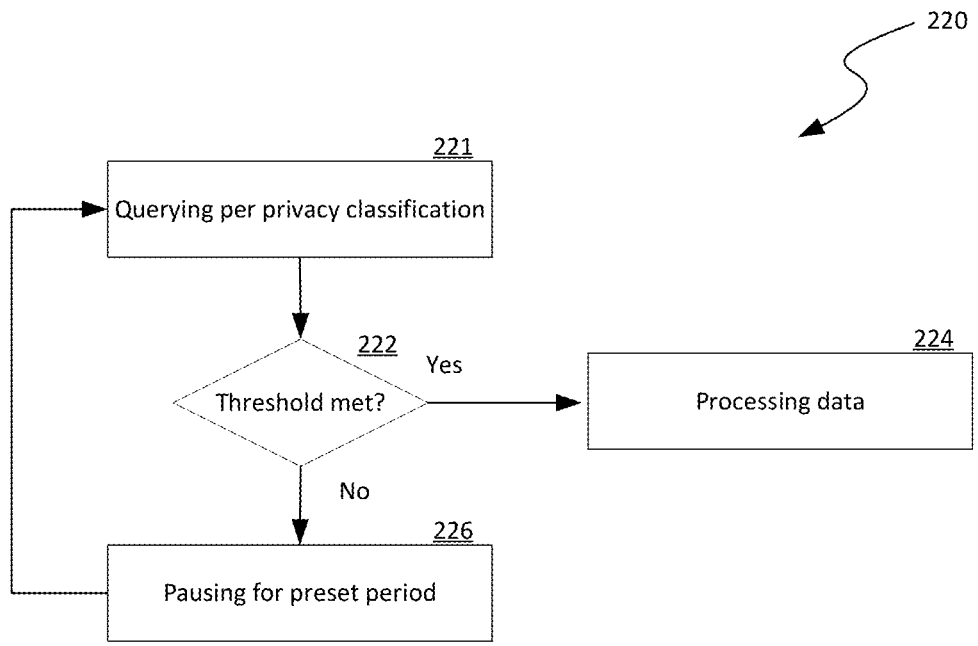

FIGS. 5A-5C are flowcharts illustrating processes of privacy data management in accordance with embodiments of the disclosed technology. Though the processes are described below in the context of the distributed computing system 100 of FIG. 1, aspects of the processes can be implemented in computing systems with additional and/or different components. As shown in FIG. 5A, a process 200 can include receiving a request for privacy information of user data at stage 202. As described above with reference to FIG. 3, the request can be received from a data consumer of the user data, such as the IDE 130. The process 200 can also include querying a data schema of the user data to identify the requested privacy information at stage 204. Example components and operations of querying the data schema are described above with reference to FIG. 3. The process 200 can then include providing the identified privacy information to the data consumer at stage 206.

As shown in FIG. 5B, another process 210 can include receiving privacy information from, for example, a privacy agent at stage 212. The privacy information can identify a privacy classification of one or more properties of a data object as well as privacy categories or classes of information the data object may contain. The process 210 can then include configuring an application based on the received privacy information in order to comply with suitable legal/regulatory requirements at stage 214. The process 210 can then include executing the application and storing output data with the received privacy information at stage 216. Example operations of configuring and executing the application are described above with reference to FIG. 3.

As shown in FIG. 5C, a process 220 can include querying user data using a privacy classification value as one or more keywords at stage 221. The process 220 can then include a decision stage to determine whether a threshold time has elapsed since the user data is generated. In response to determining that the threshold is met, the process 220 can include processing property values of the properties having the privacy classification value at stage 224. Such processing can include deletion, obfuscation, archiving, or other suitable operations. In response to determining that the threshold is not met, the process 220 proceeds to pausing for a preset period at stage 226 before reverting to querying user data using a privacy classification value at stage 221.

FIG. 6 is a computing device 300 suitable for certain components of the distributed computing system 100 in FIG. 1. For example, the computing device 300 can be suitable for the hosts 106, the client devices 102, or the privacy agent 104 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 6, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method for privacy data management in a distributed computing system configured to provide the computing resources as computing services via a computer network, the method comprising:

receiving, via the computer network, a request from a data consumer for privacy information stored as digital objects in the distributed computing system, each of the digital objects being logically structured according to a data schema defining:
- a property that is configured to contain a property value representing user information; and
- an annotation to the property, the annotation being configured to contain data representing a privacy classification of the property value contained in the property; and in response to receiving the request for the privacy information,
- inspecting the data schema of the digital objects to identify the privacy classification of the property; and
- transmitting, via the computer network, the identified privacy classification of the property to the data consumer, the transmitted privacy classification enables the data consumer to configure an application to process the property values of the property in the digital objects according to a corresponding processing requirement in one or more jurisdictions and execute the configured application to generate output data from the data in compliance to the corresponding processing requirement in one or more jurisdictions.

2. The method of claim 1 wherein:
the data schema further includes another annotation containing data representing one or more privacy data categories included in the digital objects; and
the method further includes, in response to receiving the request for the privacy information,
- inspecting the data schema of the digital objects to identify the data representing the one or more privacy data categories included in the digital objects; and
- transmitting, via the computer network, the identified data representing the one or more privacy data categories included in the digital objects to the data consumer along with the identified privacy classification of the property value contained in the property of the digital objects.

3. The method of claim 1, further comprising storing the generated output data along with the received privacy classification of the property in the digital objects.

4. The method of claim 1, further comprising:
storing the generated output data along with the received privacy classification of the property in the digital objects; and
processing, with another application in the distributed computing system, the stored output data according to the privacy classification of the property stored along with the output data from the application.

5. The method of claim 1 wherein:
storing the generated output data along with the received privacy classification of the property in the digital objects;
querying the output data for a set of one or more property values according to a preset value of the privacy classification; and
processing the queried one or more property values according to the corresponding organizational, legal, or regulatory processing requirement in the one or more jurisdictions.

6. The method of claim 1, further comprising:
receiving a user input to modify the data representing the privacy classification contained in the annotation; and
in response to receiving the user input, modifying the data schema according to the received user input to modify the data representing the privacy classification contained in the annotation without modifying the user object.

7. A method for privacy data management in a distributed computing system configured to provide the computing resources as computing services via a computer network, the method comprising:
receiving, via the computer network, a request from a data consumer for privacy information of data objects in the distributed computing system, the data objects being logically structured according to a data schema defining:
- a property that is configured to contain a property value representing user information; and
- an annotation to the property, the annotation being configured to contain data representing a privacy classification of the property value contained in the property; and in response to receiving the request for the privacy information,
- inspecting the data schema of the data objects to identify the privacy classification of the property value contained in the property of the data objects; and
- transmitting, via the computer network, the identified privacy classification of the property value contained in the property of the data objects to the data consumer, thereby enabling the data consumer to configure an application to process the property value of the property in the data objects according to a corresponding organizational, legal, or regulatory processing requirement in one or more jurisdictions.

8. The method of claim 7 wherein:
the data schema further includes another annotation to the data objects containing data representing one or more privacy data categories included in the data objects; and
the method further includes, in response to receiving the request for the privacy information,
- inspecting the data schema of the data objects to identify the data representing the one or more privacy data categories included in the data objects; and
- transmitting, via the computer network, the identified data representing the one or more privacy data categories included in the data objects to the data consumer along with the identified privacy classification of the property value contained in the property of the data objects.

9. The method of claim 7 wherein:
the application is configured by the data consumer to:
- process the property value of the property in the data objects to generate output data according to the corresponding organizational, legal, or regulatory processing requirement in the one or more jurisdictions; and
- store the output data along with the received privacy classification of the property value contained in the property of the data objects.

10. The method of claim 7 wherein:
the application is configured by the data consumer to:
- process the property value of the property in the data objects to generate output data according to the corresponding organizational, legal, or regulatory processing requirement in the one or more jurisdictions; and store the output data along with the received privacy classification of the property value contained in the property of the data objects; and the method further includes processing, with another application in the distributed computing system, the stored output data according to the privacy classification of the property value contained in the property of the data objects stored along with the output data from the application.

11. The method of claim 7 wherein:

the application is configured by the data consumer to:
process the property value of the property in the data objects to generate output data according to the corresponding organizational, legal, or regulatory processing requirement in the one or more jurisdictions; and
store the output data along with the received privacy classification of the property value contained in the property of the data objects; and the method further includes:
processing, with another application in the distributed computing system, the stored output data to generate another output data according to the privacy classification of the property value contained in the property of the data objects stored along with the output data; and
storing the generated another output data along with the privacy classification of the property value contained in the property of the data objects.

12. The method of claim 7 wherein:

the application is configured by the data consumer to:
process the property value of the property in the data objects to generate output data according to the corresponding organizational, legal, or regulatory processing requirement in the one or more jurisdictions; and
store the output data along with the received privacy classification of the property value contained in the property of the data objects; and the method further includes processing, with another application in the distributed computing system,
querying the output data for a set of one or more property values according to a preset value of the privacy classification; and
processing the queried one or more property values according to the corresponding organizational, legal, or regulatory processing requirement in the one or more jurisdictions.

13. The method of claim 7 wherein:

the application is configured by the data consumer to:
process the property value of the property in the data objects to generate output data according to the corresponding organizational, legal, or regulatory processing requirement in the one or more jurisdictions; and
store the output data along with the received privacy classification of the property value contained in the property of the data objects; and the method further includes processing, with another application in the distributed computing system,
querying the data and the output data for a set of one or more property values according to a preset value of the privacy classification; and
processing the queried one or more property values in the data and the output data according to the corresponding organizational, legal, or regulatory processing requirement in the one or more jurisdictions.

14. The method of claim 7 wherein the privacy classification of the property value contained in the property includes multiple levels of privacy classes each having a corresponding organizational, legal, or regulatory processing requirement in the one or more jurisdictions.

15. The method of claim 7, further comprising:
receiving a user input to modify the data representing the privacy classification contained in the annotation; and
in response to receiving the user input, modifying the data schema according to the received user input to modify the data representing the privacy classification contained in the annotation without modifying the user object.

16. A computing device in a distributed computing system configured to provide computing resources of the distributed computing system as computing services to users via a computer network, the computing device comprising:
a processor; and
a memory operatively coupled to the processor, the memory containing instructions executable by the processor to cause the computing device to:
receive, via the computer network, a request from a data consumer for privacy information of data objects in the distributed computing system, the data objects being logically structured according to a data schema defining:
multiple properties individually configured to contain a property value representing user information; and
multiple annotations individually corresponding to one of the multiple properties, the multiple annotations individually containing data representing a privacy classification of the one of the multiple properties; and
in response to receiving the request for the privacy information,
inspect the data schema of the data objects to identify the privacy classification of the multiple properties of the data objects; and
transmit, via the computer network, the identified privacy classification of the multiple properties of the data objects to the data consumer, thereby enabling the data consumer to configure an application to process values of the multiple properties in the data objects according to the transmitted privacy classification.

17. The computing device of claim 16 wherein:

the data schema further includes another annotation to the data objects containing data representing one or more privacy data categories included in the data object; and the memory includes additional instructions executable by the processor to cause the computing device to, in response to receiving the request for the privacy information,
inspect the data schema of the data object to identify the data representing the one or more privacy data categories included in the data objects; and
transmit, via the computer network, the identified data representing the one or more privacy data categories included in the data objects to the data consumer along with the identified privacy classification of the multiple properties of the data objects.

18. The computing device of claim 16 wherein:

the application is configured by the data consumer to:
process the property value of the property in the data objects to generate output data according to the corresponding organizational, legal, or regulatory processing requirement in the one or more jurisdictions; and store the output data along with the received privacy classification of the multiple properties of the data objects.

19. The computing device of claim 16 wherein the privacy classification of the multiple properties includes multiple levels of privacy classes each having a corresponding organizational, legal, or regulatory processing requirement in the one or more jurisdictions.

20. The computing device of claim 16 wherein the memory includes additional instructions executable by the processor to cause the computing device to:

receive a user input to modify the data representing the privacy classification contained in the annotation; and in response to receiving the user input, modify the data schema according to the received user input to modify the data representing the privacy classification contained in the annotation without modifying the user object.

* * * * *